D. H. LENTZ.
APPARATUS FOR BALLING SCRAP METAL.
APPLICATION FILED JAN. 6, 1911.
1,012,872.
Patented Dec. 26, 1911.
7 SHEETS—SHEET 1.
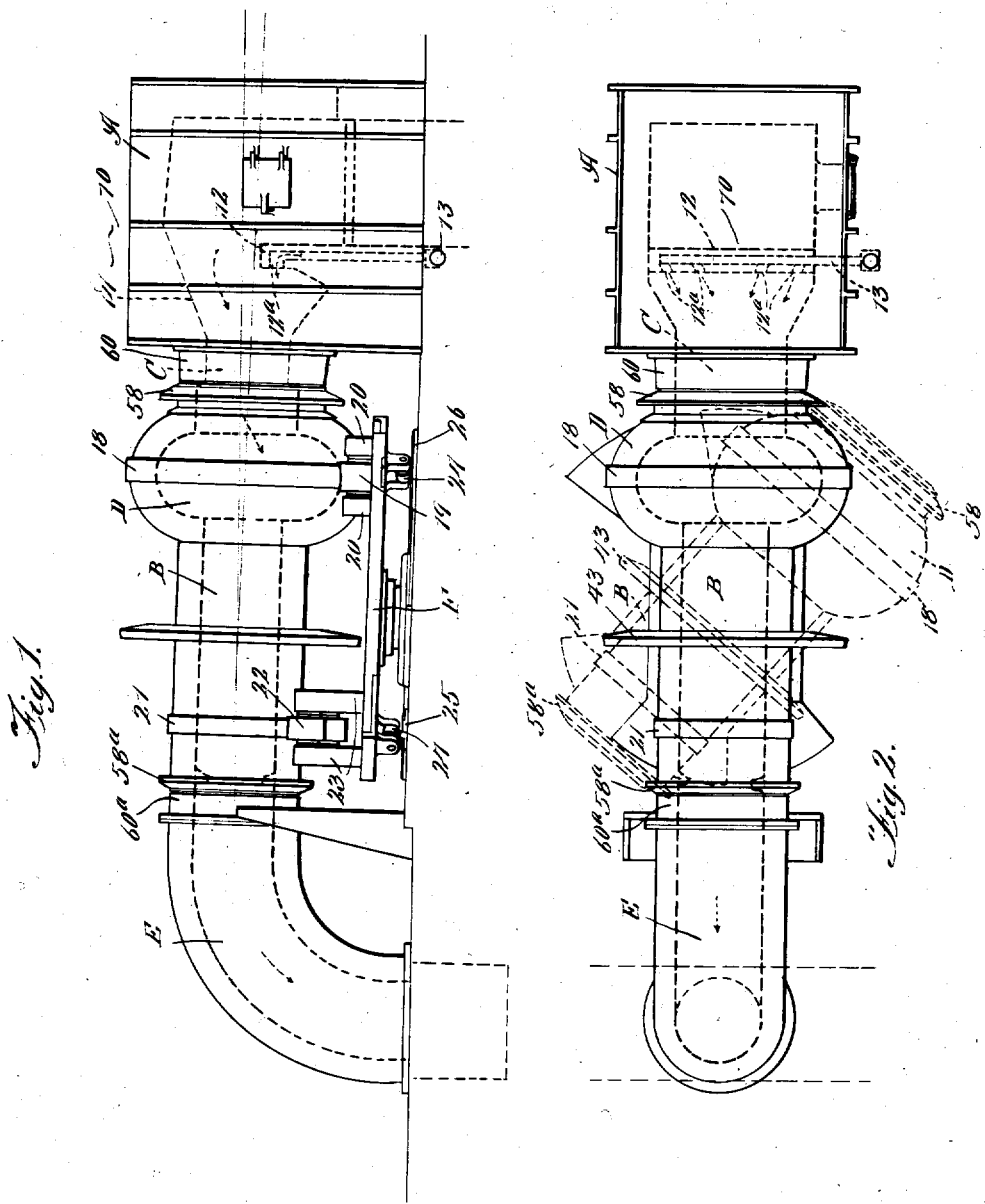

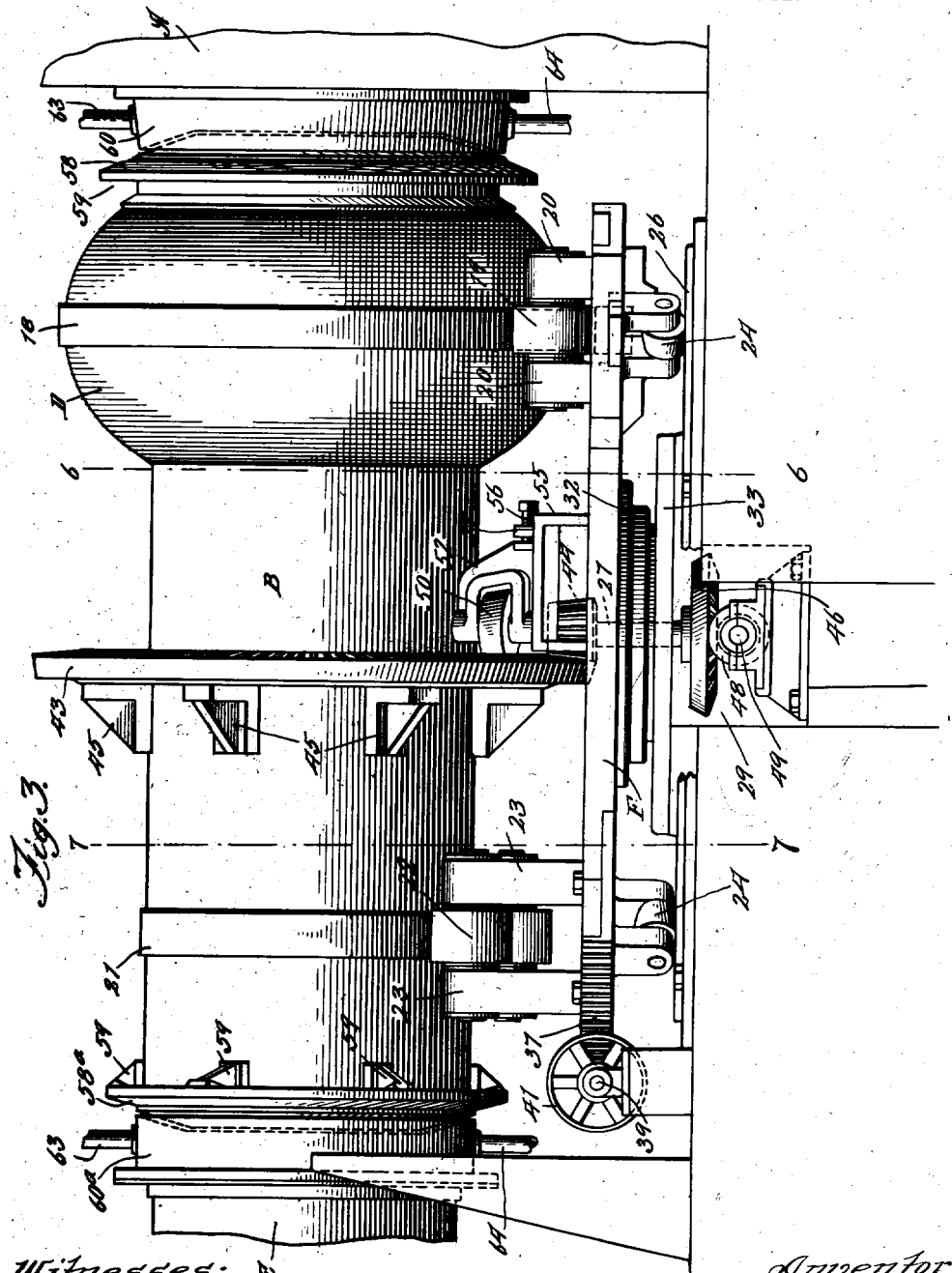

D. H. LENTZ.
APPARATUS FOR BALLING SCRAP METAL.
APPLICATION FILED JAN. 6, 1911.
1,012,872.
Patented Dec. 26, 1911.
7 SHEETS—SHEET 3.
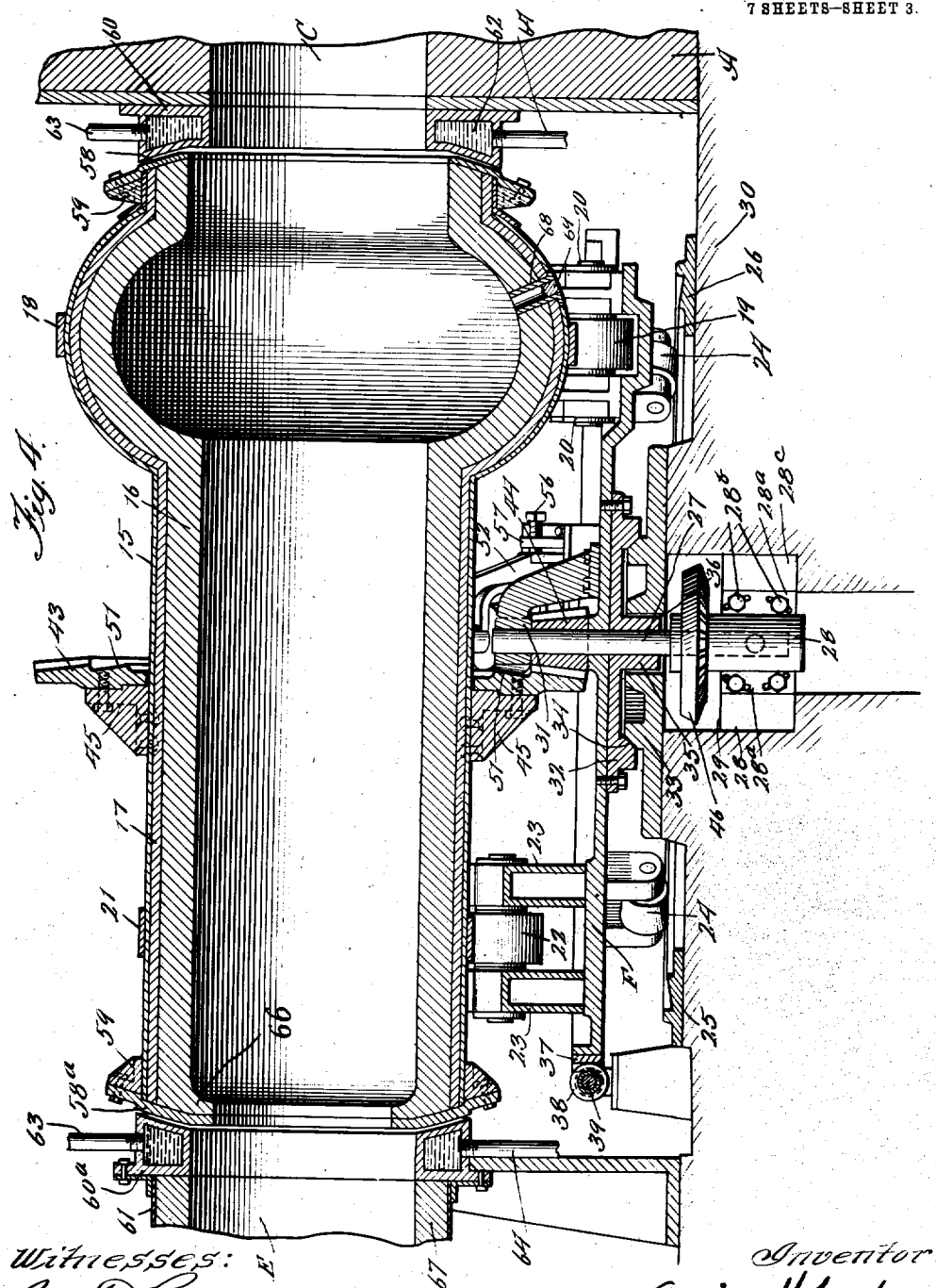

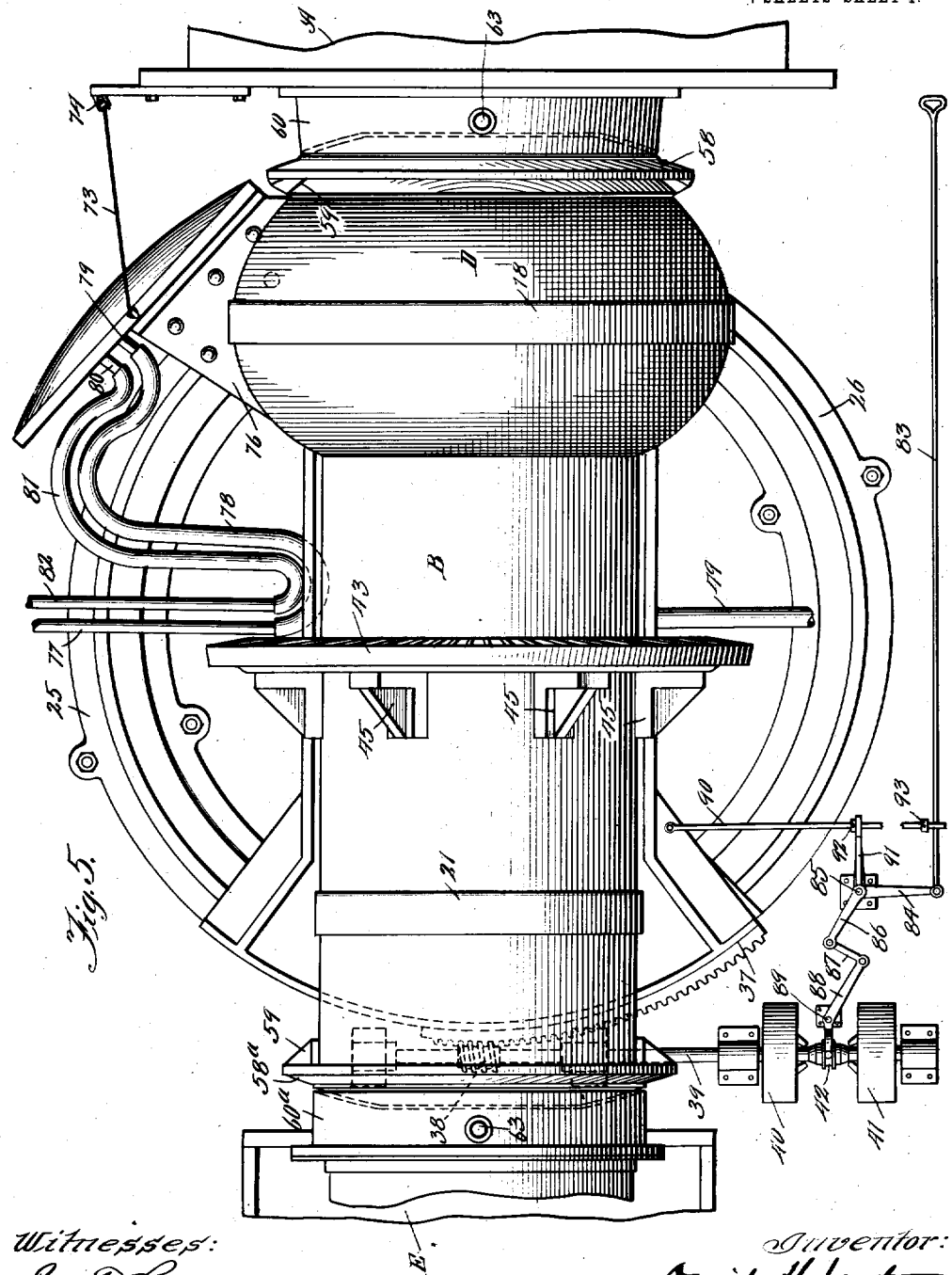

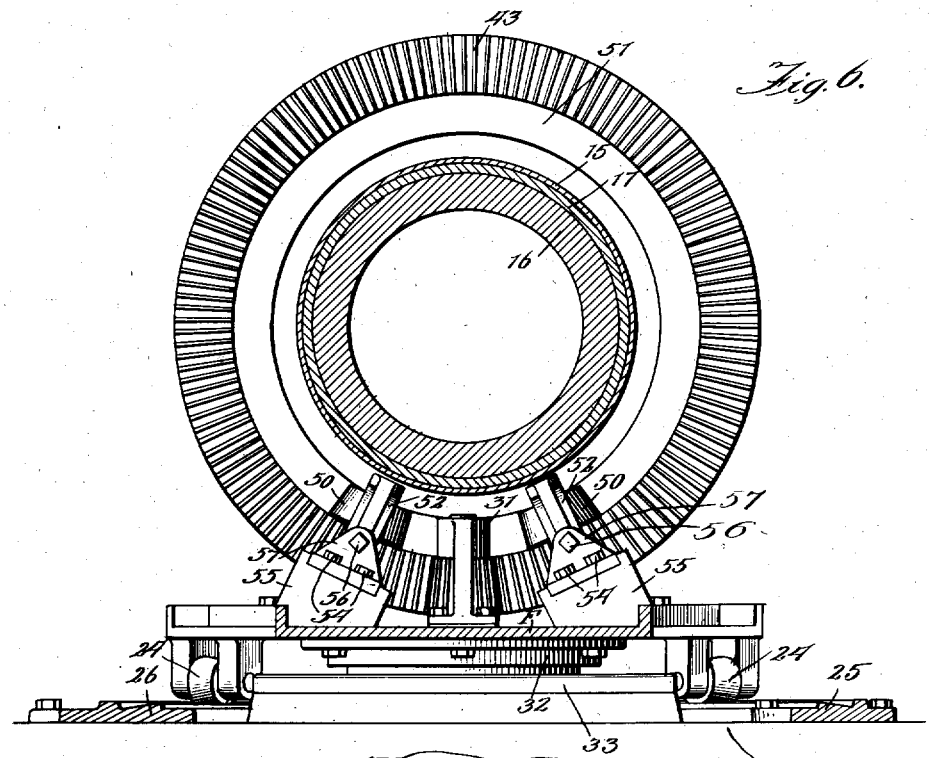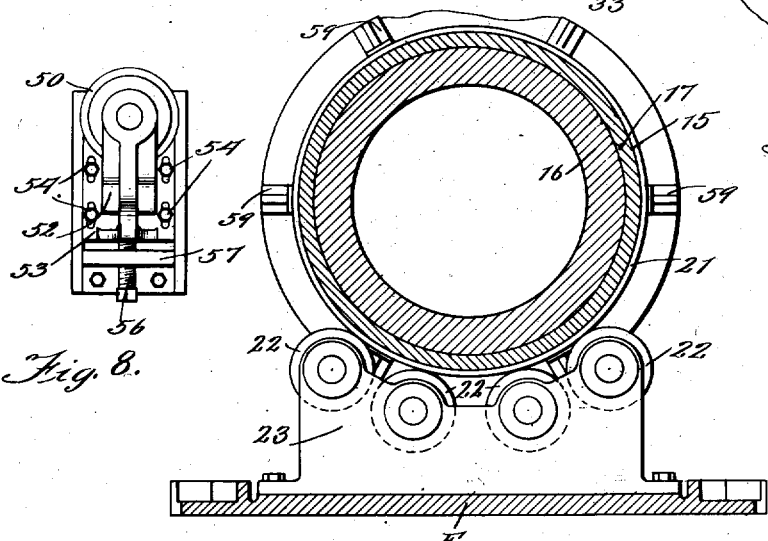

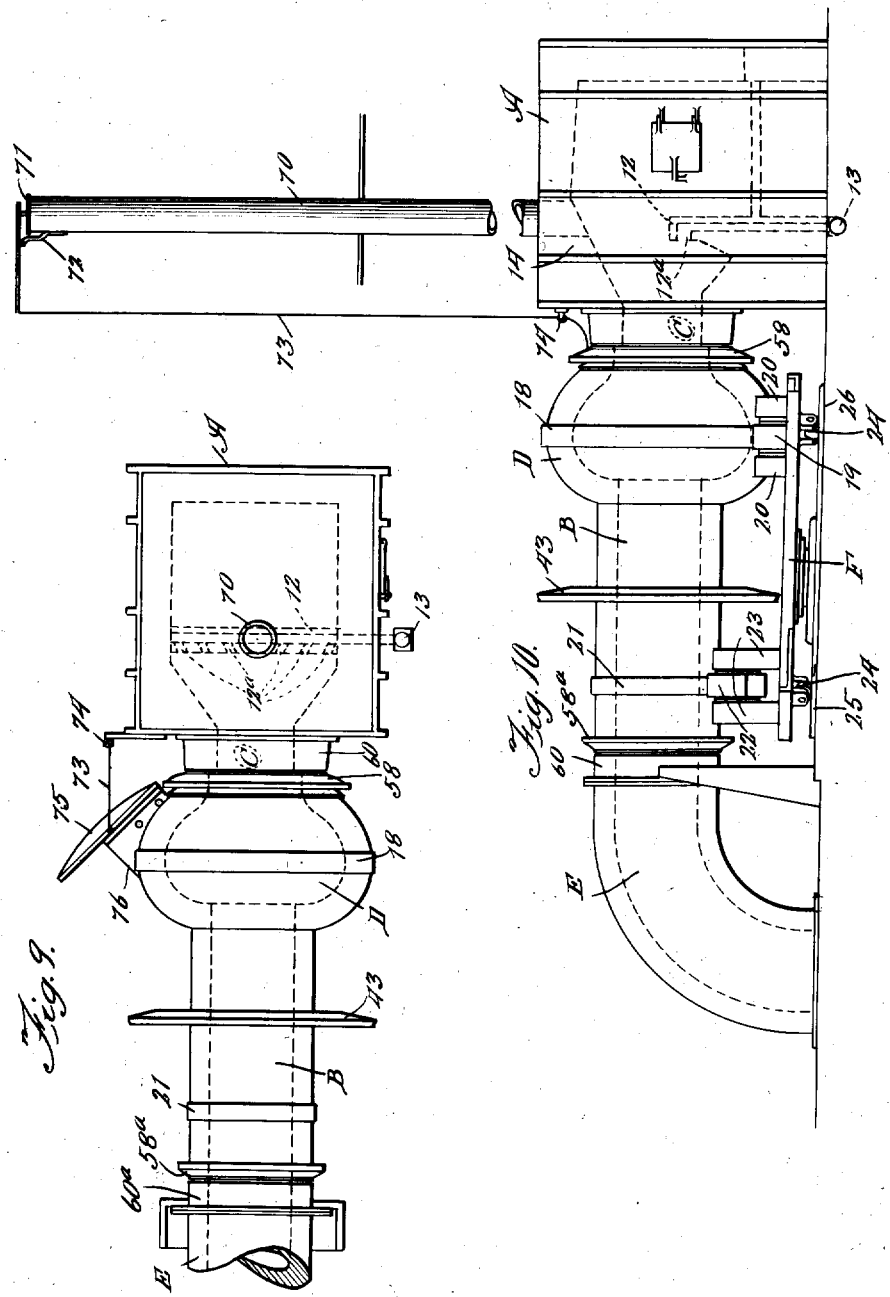

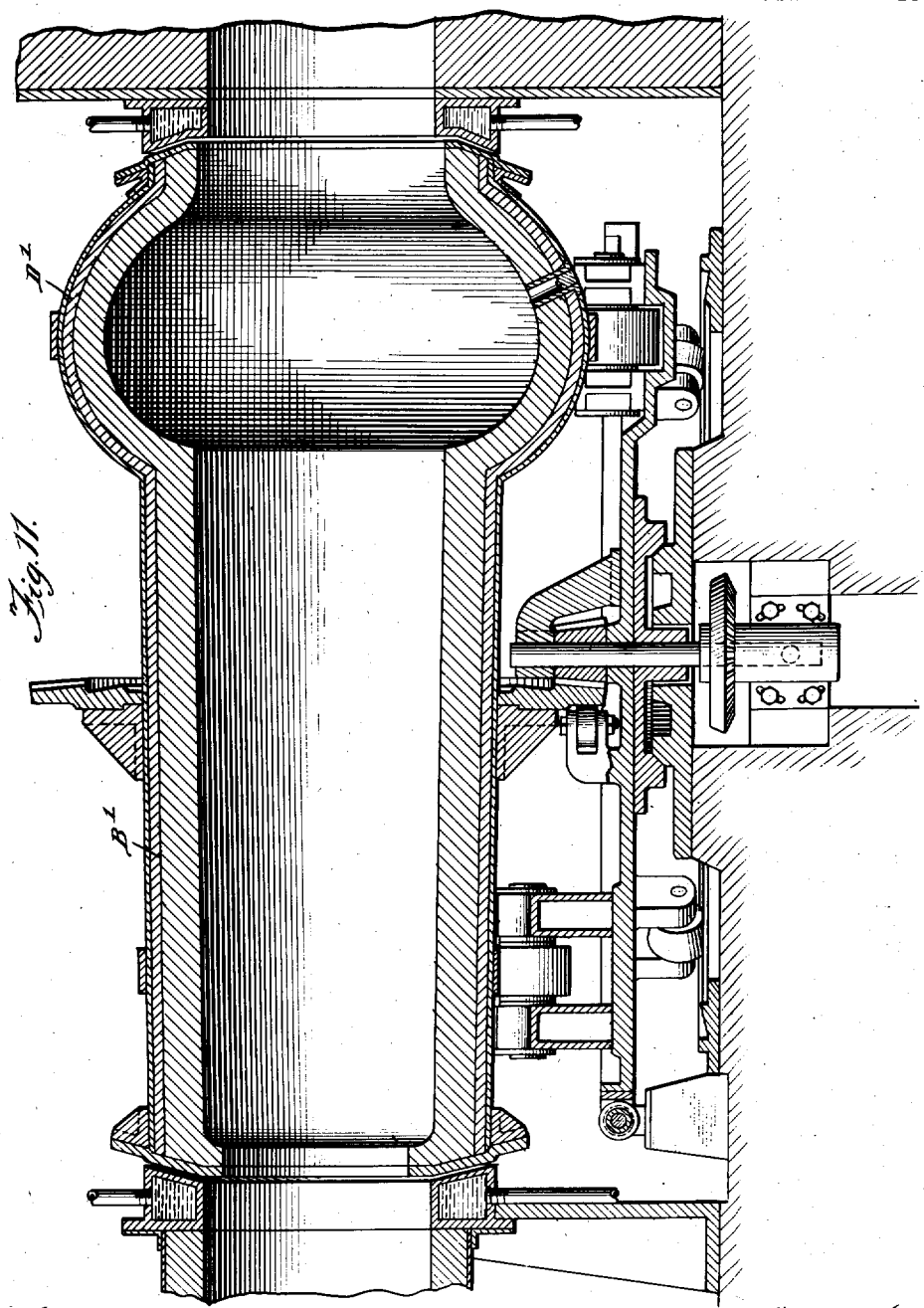

UNITED STATES PATENT OFFICE.

DAVID H. LENTZ, OF CHICAGO, ILLINOIS.

APPARATUS FOR BALLING SCRAP METAL.

1,012,872.  Specification of Letters Patent.  Patented Dec. 26, 1911.

Application filed January 6, 1911. Serial No. 601,132.

*To all whom it may concern:*

Be it known that I, DAVID H. LENTZ, a citizen of the United States, residing at Chicago, in the county of Cook and State of Illinois, have invented certain new and useful Improvements in Apparatus for Balling Scrap Metal, of which the following is a specification.

My invention relates to an apparatus for balling scrap metal, and the invention has for its object to provide a new and improved form of apparatus for welding scraps of metal into compact and relatively homogeneous masses or balls. While a sphere or ball is, for various reasons, one of the most desirable forms in which to form the scrap, and while, in the preferred embodiment of my invention, the scrap will be formed into a spherical or substantially spherical mass, nevertheless it should be understood that, for the most part, I use the term "balling" as a convenient term for describing generically the welding of a mass of scrap into a single mass, regardless of the proportions or contour of the mass.

The principal object of my invention is to provide mechanism whereby scrap iron may be fed into the mechanism as scrap and may be so treated by the operation of the mechanism as to unite it into a relatively solid mass of iron.

A further object of the invention is to provide such mechanism whereby scrap iron may be united into a mass of any desired weight and of suitable shape, size and quality to be directly worked into billets, which may be directly rolled into commercial forms of marketable quality.

Another valuable purpose of my invention is to provide such apparatus or busheling furnace whereby scrap iron may be balled much more rapidly than has heretofore been possible, with a minimum loss because of oxidation of the iron, with a minimum development of cinder, with a greatly reduced fuel cost, and with unskilled labor.

A further object of my invention is to provide such an apparatus which will continuously produce, from scrap iron, balls or other masses of iron of substantially uniform weight, size and shape, thereby simplifying the further handling and working of the metal into commercial forms.

A further object of the invention is to provide a rotary furnace, suitable for balling scrap, in which the scrap is subjected to a preheating operation before it reaches the welding or balling chamber.

A further object of the invention is to provide a furnace of this character in which the metal is cleaned and the impurities carried away before the welding or balling operation takes place.

A further object of the invention is to provide a furnace in which the preheating takes place while the charge is spread out in a relatively thin layer and preferably while it is kept in motion, preferably a rolling motion, so that the heating is thorough. A minimum fuel consumption is required, the entire charge is heated rapidly and oxidation of the charge is largely avoided.

A further object of the invention is to provide means for automatically introducing the pieces constituting a given charge into the balling chamber a few at a time and so that the heavier pieces reach this place before those which are relatively lighter, whereby it becomes possible to vary the time to which the elements of the charge are subjected to the most intense heat in proportion to their respective masses.

Another object of my invention is to provide such an apparatus whereby the charge of scrap will be spread out and then caused to travel through a zone of gradually increasing temperature, while the scale, rust and like impurities, if any, are being removed and carried away, so that the elements of the charge are preheated before reaching the balling chamber, are caused to travel into the zone of intense heat at a speed proportioned to their respective masses and, when suitably heated, are gathered together in the balling chamber and so manipulated by the operation of the machine that the weight of the charge is utilized to weld the mass into a relatively solid body.

Another object of my invention is to provide such an apparatus which can be charged at one end while the ball or other metal mass is being removed from the other end, thereby not only increasing the efficiency of the machine, but, what is more important, minimizing the cooling of the highly heated and preferably refractory lining of the preheating and balling chambers.

Another object is to provide a suitable apparatus for forming a ball out of scraps of metal by operations which are carried out automatically; thus decreasing the cost of producing the balls by eliminating high paid hand labor and making it possible to produce much larger balls than is possible when the work is done by hand. By use of the present apparatus a ball is produced from which a billet can be made large enough for almost all the common rolling operations.

The invention is illustrated, in certain preferred embodiments, in the accompanying drawings, wherein, Figure 1 is a somewhat diagrammatic view, in side elevation, of one form of the apparatus, certain of the working parts of the operative machine being omitted; Fig. 2 a plan view of the apparatus shown in Fig. 1; Fig. 3 a side elevation of the rotary element of the furnace, together with an operative form of driving mechanism for the same; Fig. 4 a longitudinal sectional view of the parts shown in Fig. 3. Fig. 5 a plan view of the same; Fig. 6 a sectional view taken on line 6—6 of Fig. 3 looking in the direction of the arrows; Fig. 7 a sectional view taken on line 7—7 of Fig. 3, looking in the direction of the arrows; Fig. 8 a detail plan view illustrating one of the devices employed for taking the strain from the driving means of the rotary; Fig. 9 a plan view; Fig. 10 a side view illustrating, particularly, certain devices employed for closing the furnace when the rotary is in the charging position, and for opening a valve in the furnace stack; and Fig. 11 a fragmentary longitudinal section showing a modified form of rotary.

Like characters of reference indicate like parts in the several figures of the drawings.

Referring to the drawings, the apparatus, in the preferred form shown, consists, broadly speaking, of a fire box A; a rotary cylinder or barrel B, constituting a preheating chamber, formed on the end adjacent the flame-way C of the furnace, with an enlargement D constituting a balling or welding chamber; a discharge flue E which carries off the products of combustion from the cylinder B; a turn-table F, or other suitable revoluble support for the rotary element B, D, by means of which it may be turned out of alinement with the flame-way C and flue E for the purpose of charging; and driving mechanism for revolving the rotary element on its axis and for rotating the turn-table. The axis of revolution of cylinder B is preferably oblique to the horizontal, that is, the bottom of the cylinder B at the charge end, adapted to aline with flue E, is higher than at the other end. As a result of this arrangement, the revolution of the barrel B brings about a gradual gravity feed of the scraps of metal constituting the charge, which results in spreading the charge out in a relatively thin layer and in an automatic sorting of the pieces in accordance with their weight. Thus, the heavier pieces reach the welding chamber before the lighter pieces, and consequently are subjected to the intense heat in the welding chamber for a longer period of time than the lighter pieces. All of the charge, instead of entering the welding chamber in a relatively cold state, is subjected for some little time to the lesser heat of the barrel which, of course, increases as the welding chamber is approached, and the charge is thus gradually heated. The charge is likewise agitated or tumbled by the rotary movement of the barrel, so as to loosen the rust, scale and dirt with which the pieces are likely to be incrusted. These impurities are carried off through the flue E by the hot blast from furnace A. So, also, this tumbling or agitation of the charge in the path of a blast of heat submits each individual unit of the charge to a separate tumbling and cleaning action, whereby, under the combined influence of agitation, heat and blast, all superficial impurities are effectively removed from the individual units and from the entire charge, making it possible to produce by this busheling treatment a ball and billet of refined iron of far better quality than has heretofore been produced from scrap and to do so by a single heat. Furthermore, the highly heated, refractory lining has an important part in this preheating operation and by this tumbling treatment the charge is shifted constantly or from time to time to different surfaces of the highly heated, refractory lining, thereby, on the one hand, preventing undue cooling of the lining at the points where the charge rests from time to time, and on the other hand, constantly or successively subjecting the charge to heat radiated from fresh surfaces of the refractory lining. The other advantageous features of my apparatus will be apparent from a more detailed description of the apparatus. The refractory lining, which is preferably used in the cylinder B and in the balling chamber, is preferably kept at a white heat and thereby efficiently assists in the preheating of the charge.

The fire box A is preferably constructed with a bridge wall 12, formed with a plurality of perforations 12$^a$ through which compressed air from the pipe 13 may be directed through the lower portion of the flame-way C leading from the fire box into the welding chamber D. The latter, it will be seen, is of greater diameter than the flame-way, for the purpose, of course, of retaining the charge, and it is therefore desirable that the flame from the furnace should be directed downwardly into this enlargement. This may be accomplished by the air blast above described, which also increases the temperature by the introduction at this place of additional oxygen. Preferably also the upper wall of the furnace 14, above the bridge wall, is formed on a slant, as shown in Fig. 1. Of course, any suitable construction may be used to provide a blast of heat into the balling chamber and through the preheating chamber, and the furnace walls may be given any suitable contour to direct the blast of heat in the direction required.

The rotary B, D is preferably formed of the outer metal sheathing 15, the inner lining 16 of some suitable refractory material, and interposed between these elements, a spongy or resilient packing or filler 17 of asbestos, which lessens radiation and permits a certain amount of expansion in the lining 16 without injury to or destruction of the metal shell. Extending around the exterior of the welding chamber D is a track 18 which bears upon a set of rollers 19 mounted in suitable bearings 20 on the turntable F. A similar track 21, on the barrel B, bears upon rollers 22 mounted in bearings 23 on the other side of the turn-table. As stated, the arrangement is preferably such that the end of the rotary supported on the rollers 22 is above the welding chamber end.

The turn-table F is provided with the preferably conical rollers 24 which run on curved tracks 25, 26. The turn-table rotates on a central shaft 27 carried in a bearing 28, shown as located in an opening 29 in the foundation 30 on which the apparatus rests, and carried at the upper end in a bearing 31 on the turn-table. Preferably a bearing in the nature of a ball and socket connection is formed between a plate 32 bolted to the under side of the turn-table and a plate 33 resting on foundation 30, these plates having the co-engaging, curved surfaces 34. Plate 32 has a boss 35 which enters an opening 36, of somewhat larger diameter, in the plate 33, this permitting a little play between the parts in case the turn-table, for any reason, should not run with perfect evenness on the track. The bearing 28 has the slotted lugs 28ª through the slots of which extend bolts 28ᵇ securing the bearing to a transverse member 28ᶜ. This gives some flexibility to the mounting of the rotary and permits angular adjustment when necessary by simply changing rollers 24, for those of a different diameter.

The turn-table is provided with a sector gear 37, which is meshed by a worm 38 on a shaft 39 adapted to be clutched to one or other of the oppositely revolved pulleys 40, 41 by means of the clutch 42, which latter may be of any preferred construction.

The barrel B is provided with a circumferential bevel gear 43 which is meshed by a bevel pinion 44 carried on the pivotal shaft 27 of the turn-table F. Bevel gear 43 is shown as bolted to brackets 45 which are riveted to the shell 15. Shaft 27 carries a bevel gear 46 meshed by a bevel pinion 48 on the shaft 49 which may be driven in any suitable manner. By this arrangement the rotary B, D may be revolved on its axis, and, when necessary for charging or removing the ball, the turn-table may be turned on its pivot without disengaging the driving means by which the rotary is driven or, if desired, without stopping such revolution.

Where the rotary is tilted, it is desirable that some means be provided for taking the end thrust, so as to relieve the strain between gears 43 and 44. This is done preferably by means of the idlers 50 which bear against a flat surface 51 on the gear 43. The idlers are mounted in brackets 52 carried on slides 53 adapted to be bolted by the bolts 54 to their supports 55. The slides 53 are positioned by means of the set screws 56 extending through brackets 57 bolted to the supports 55. The ends of the rotary are beveled, as shown, and preferably finished by the rings 58, 58ª, reinforced by brackets 59. The beveled ends of the rotary aline with correspondingly formed annular members 60, 60ª secured, respectively, to the furnace and to the metal shell 61 of flue E. Preferably these annular members are formed with the water conduits 62 through which water is circulated by means of the pipes 63, 64. Preferably the flame-way C and the annular member 60 are narrower than the mouth of the welding chamber 65, and preferably also the end of the barrel has the internal projection 66, the purpose of these constructions being to protect the adjacent parts from the destructive effects of the flame.

The flue E is provided with a lining 67 of refractory material. It is desirable to provide the welding chamber with a slag outlet. This is shown as a thimble 68 extending through the refractory lining of the chamber and closed by a plug 69.

The apparatus is preferably provided with means for closing the flame-way from the combustion chamber when the rotary is turned to its charging position and with means for, in such case, diverting the flame in another direction. The furnace, to this end, is provided with a stack 70 adapted to be closed by a damper or valve 71 pivoted to a bracket 72, a cord or cable 73 being attached to the outer end of the valve running through a pulley 74 on the furnace and being attached to the water shield 75 carried by the turn-table—supporting the rotary. When the rotary is swung into charging position, the pull on cord 73 opens the valve 71. This same movement of the rotary brings the water shield 75 in front of the flame-way C of the furnace. This water shield consists of a disk-shaped vessel secured to a bracket 76 on the side of turn-table F. Water is fed into the bottom of the water shield through a pipe 77, hose 78 and nipple 79. It passes out of the water shield through nipple 80, hose 81 and pipe 82 (Fig. 5). The cooled surface of the water shield, of course, tends to keep down the temperature of the metal surfaces to which it is opposed when the rotary is in operating position.

The apparatus is preferably also provided with hand operated mechanism for shifting the clutch 42 which is so constructed that, at the proper time, the movement of the rotary to either its charging or welding position is automatically stopped.

Referring particularly to Fig. 5, 83 is a controlling rod pivoted to one of the arms 84 of a three-armed casting which turns on a stationary pivot 85. Another of these arms 86 is connected by means of a link 87 with a bent arm 88 having the fixed pivot 89 and formed in a suitable manner to engage with and operate the clutch 42. A rod 90 passes through an opening in the third arm 91 of the three armed member and carries two collars 92, 93. The clutch is thrown in one direction or the other, as may be desired, by pushing or pulling upon rod 83. The adjustment of collars 92 and 93 on rod 90 is such that when the rotary reaches the limit of its swing in either direction one of these collars comes into contact with arm 91 and throws out the clutch.

The operation of the apparatus above described is as follows: Before beginning operations, the apparatus should be heated until the refractory lining throughout the rotary is brought to a white heat, as a much more efficient and rapid heating of the charge with a relatively short rotary will be obtained when these conditions are observed. The rotary B, D is then turned into the dotted line position of Fig. 2 by means of the worm 38 operating on sector gear 37, and the charge dumped into the upper or outer end of the barrel B. This movement of the rotary opens the stack valve and brings the water shield to its normal position in alinement with the flame-way C and flue E, the stack valve being closed by this movement, and is rotated by application of power to shaft 49. The revolution of B, D on its axis need not be stopped during the operation. The charge, which may consist of a number of pieces of old metal, old iron for example, of various sizes and which are likely to be covered with rust, scale and dirt, is fed gradually toward the welding chamber D by the rotary movement of barrel B. This movement, in the first place, spreads out the charge so that the flames reach every part of it. Further, the feeding movement is such as to clean the scrap, the pieces being rubbed together and against the inner surface of the cylinder as they move toward the welding chamber. The strong blast through the cylinder carries away the dislodged impurities. This rotary movement of the cylinder also results in an automatic sorting of the scrap according to weight. The heavier pieces reach the welding chamber first and are, therefore, subjected to the very intense heat at this point for a longer period of time than the comparatively lighter pieces. The latter, however, are subjected to considerable heat while they are in the barrel, this heat gradually increasing as they approach the welding chamber. The result is that the heavier pieces, which require more heat in order that they should be brought to a suitable welding condition, get the amount of heat that they require, while the lighter pieces are more gradually heated before being subjected to the intense temperature of the welding chamber which would otherwise be likely to burn them up wholly or partially. The lighter pieces are, of course, in the welding chamber a shorter time. The charge, thus eventually collected together in the welding or, as it may be called, balling chamber, is rolled around the interior surface of the same until it is welded together to form a relatively homogeneous ball or mass. After this, it may be put through a squeezer or otherwise treated.

While the barrel may be proportioned to its speed of rotation to operate continuously as above described, I have obtained highly satisfactory results with a relatively short barrel, by first rotating the barrel sufficiently to spread the charge, then stopping it for a few seconds, again rotating it, so as to shift the position of the individual elements of the charge to the other white hot surfaces from those which they initially occupied, and so on until the entire charge is sufficiently heated, which may be observed by watching through a suitable peep-hole in the apparatus. Of course, with a large charge, it may be that the individual units will not come in actual contact with the refractory lining, but the charge will assume the form of a loose, elongated pile subjected to the direct blast passing through the rotary as well as to the radiated heat from the refractory lining, and, as the rotary is turned either continuously or periodically, the position of this elongated, loose pile is shifted, so that the individual units are thoroughly heated on all surfaces and are effectively cleaned of impurities by the tumbling action, the blast and the oxidizing effect of the heat. When the device is operated in this manner, the operator soon learns when the entire charge is in condition for welding or, indeed, after a few operations he will learn just how many minutes must be required for the charge to travel through the barrel to become suitably heated. As soon as the entire charge is suitably heated and all of it has been conveyed into the balling chamber, the rotary will be rotated more rapidly, for it is now desirable to complete the welding of the charge into a single mass or ball as quickly as possible, not only, to increase the output of the machine and reduce the fuel cost per ton of metal treated, but also to minimize loss by burning or oxidation. The same result can be attained by continuously operating the rotary, first at slow speed, during the heating process, and then at rapid speed during the balling stage.

With this apparatus operated as above described, I can form a relatively solid ball of metal weighing five hundred pounds or more from cold scrap at the rate of one ball every ten minutes or less and with a fuel consumption of five hundred to seven hundred pounds of coal to a ton of metal, a result which it has been impossible to heretofore attain by any means heretofore known, a result which it has been impossible to attain in any degree with any mechanism of which I have any knowledge, and a result which has vastly increased the product of a single furnace in twenty-four hours over anything heretofore known, reduced the fuel consumption by nearly three-fourths and, by the elimination of skilled labor, brings down the labor cost, while the quality of the product is far superior to the product heretofore produced by any busheling operation of which I have any knowledge.

It will be seen that by beveling the end of the balling chamber and the corresponding part of the furnace with which it alines, the tendency of the cold air to suck in through the space which intervenes at this place is largely or wholly counteracted. This is important because there is a tendency here to develop an outflow of cinder or metal resulting possibly from units of the charge which occasionally escape from the rotary at this point and possibly from the effect of heat on the brick or from an overflow of cinder at this point. As the cinder will freeze rapidly upon being exposed to a reduced temperature, the outflow of heat at this point tends to maintain a temperature which will keep the fluid cinder or metal in a fluid condition until it has dropped clear of the apparatus, where otherwise it would tend to freeze or solidify between the furnace and the end of the rotary and thus clog and stop the operation of the machine. The reversed construction at the other end of the rotary produces just the opposite result; and at this point it is desirable that air should be introduced so as to complete the combustion of the gases. The flue E is a down draft flue, so that the flames through the barrel B are kept down close upon the metal.

In Fig. 11 I have shown a somewhat modified form of rotary. The barrel B′ is tapered or flared, being wider at the balling chamber end than at the other end. This gives the necessary incline or a part of it, as the rotary as a whole is preferably inclined, and also assists in the feeding of the material by obviating any tendency, which there may be in a straight barrel, for the material to roll back and crowd. With a tapered barrel, the material constantly spreads as it moves downwardly because of the constantly increasing radius of the curved surface on which it is supported. The configuration of the interior of the balling chamber D′ is also different from that shown in the other figures. The hearth of the balling chamber is formed, with respect to its longitudinal curvature, on a curve which is considerably greater than that of the ball intended to be formed thereon, and is so disposed that there is a constant tendency for the ball to roll longitudinally of the hearth as well as transversely thereof. That is, instead of tracking around the middle of the hearth in a circular path at right angles to the axis of rotation, the ball is intermittently carried a little way up the sloping side of the hearth and then allowed to roll or slide back into the center. This insures the spherical shape of the ball. Specifically in the present case this result is obtained by flattening the hearth curvature on the side of the hearth adjacent the combustion chamber, the whole rotary element being tilted down in this direction.

A further important advantage of this contour of the balling chamber is that the bottom of the balling chamber extends toward the combustion chamber at substantially the same angle as the line of travel of the blast of heat entering the balling chamber. Consequently the blast of heat will sweep down into and across the bottom of the balling chamber and in immediate contact therewith, so as to surround the various units of the charge as they drop into the balling chamber, thus utilizing the most intense heat to best advantage and, as these units unite into a gradually growing mass, this mass will split the volume of flame, so that it will completely surround the mass or ball, thus obtaining the highest efficiency from the body of flame. By virtue of this treatment, the manner in which impurities are removed and the rapidity with which the scrap is formed into the finished ball or other relatively solid mass, thus minimizing the time of exposure to high temperatures and the consequent loss by burning or oxidation, and by virtue of the further fact that each individual particle of the charge is thoroughly brought to a welding condition, the resulting ball is of such a superior quality, that it is suitable for being formed directly into billets, instead of being of a character suitable only for forming into "muck bars," as is necessarily the case with balls formed by other busheling treatments. Because of this fact and because of the further fact that I can produce balls of any desired weight and, therefore, can form directly therefrom billets or blooms of any desired size, a ball formed with my machine can be passed directly to a squeezer without reheating and from the squeezer can be passed to any suitable rolls, reheating being necessary only as the resulting billet becomes too cool for working through the rolls, but not being necessary as incident to further treatment to convert the usual light and porous ball into metal of a suitable dense character with a "skin" or surface which will permit of its being rolled into commercial shapes of satisfactory quality. Where other processes are used, the entire charge is heated as a mass, with the result that the heating of the exterior of the charge is objectionably prolonged in order to obtain a proper heating of the interior of the charge, or else the interior is insufficiently heated, so that the resulting ball is not homogeneous, but, aside from this, previous methods must be operated by hand, as previous machines have been a failure, the amount of metal which can be busheled by hand is limited, so that, if the resulting ball were otherwise of suitable quality, a billet which could be formed therefrom would only be large enough for certain limited uses, but, as a matter of fact, the resulting ball is of such a physical quality and usually so impure that it cannot be rolled into usable commercial forms and consequently such balls are rolled into "muck bars," which, in turn, are cut up to form boxes which are packed with scrap, raised to a welding heat in furnaces and then rolled and manipulated to form billets. These operations of the prior art require highly paid, skilled labor, excessive fuel consumption, slow operations, an unnecessary loss by burning or oxidation and a low quality of product, especially if the scrap is not given a preliminary tumbling treatment to remove scale, etc. It will be appreciated that the superficial impurities on the scrap which is packed into these boxes will largely or wholly remain as these boxes or charges are brought to a welding temperature and will also remain in the billets which result from passing these heated boxes through rolls, except as some part of the impurities may be squeezed out of the resulting billet in the form of cinder. Consequently, billets formed in this manner are very inferior to those resulting from billets rolled directly from the ball produced with my apparatus and process, because they are made of necessarily impure iron. The amount of "cinder" or slag formed with my mechanism is inconsiderable and may either be absorbed by the use of metal borings or may be drawn off through a suitable tap hole in the balling chamber at long intervals. The excess of slag, if any, in the ball, will be removed by treatment in the squeezer.

While I have shown my invention as embodied in certain forms of apparatus which I consider most desirable, it will be readily understood that modifications in the forms, constructions and in arrangement of the parts shown might be devised without departure from the invention. Therefore, I do not limit myself to these particulars except so far as the same are made specifically limitations on certain of the claims herein.

The foregoing specification will fully advise those skilled in the art as to the construction and operation of apparatus embodying my invention and they will understand, as previously noted, that by a "ball" is meant a mass of roughly welded iron of roughly spherical form or other suitable contour which will permit the mass, when taken from the apparatus at a welding temperature, to be handled as an entirety and, as such, to be inserted in suitable apparatus, such as the familiar squeezer, which will bring it to a rough, billet like form of suitable size and contour for being passed through rolls, this rolling being usually the step which completes the welding of the heated mass into a homogeneous body of iron which comes out of the rolls as a billet ready for commercial use. By the treatment which I have above outlined, the scrap is so purified and so effectively heated throughout the entire charge that it may be without further heating roughly shaped by a squeezer and then rolled to a compact, homogeneous billet, and, indeed, may then, by a short superficial or "wash" heating, be brought in a few minutes to a temperature which will permit of this billet being immediately rolled to commercial form, such as tie plates, angle bars or other desired forms.

It will also be understood by those skilled in the art that the object of a balling apparatus is attained when the charge has been purified, brought to a welding temperature throughout and roughly welded into a single mass sufficiently uniform and compact to permit of its effective handling as a single unit so as to be reduced to a homogeneous billet by treatment as in squeezers, rolls and the like, and preferably without further heating. Therefore, while it might be possible with my apparatus to further compact and weld the ball by continuing its rotation in the balling chamber, it would not ordinarily be good commercial practice so to do, because an unnecessary prolongation of the heating of the charge increases the furnace loss by oxidation and the welding of the mass into a homogeneous body, when thus prepared in the balling chamber, can be better accomplished in squeezers and rolls and the function of the balling apparatus is fully accomplished when the charge has been purified, brought to a welding temperature and sufficiently united into a single ball or mass to permit of its further treatment in squeezing or rolling devices.

When in the specification I have referred to the ball as "solid" or "relatively solid", it will be understood by those skilled in the art that the ball consists of a loosely welded mass of scrap, but that, as compared with the ordinary hand puddled ball, it is relatively solid and compact, that is, for the same weight of metal the ball produced by me is of much smaller dimensions than the ordinary hand puddled ball and this makes it practical to readily and economically handle balls weighing six hundred pounds and upwardly and to quickly reduce them to compact, homogeneous billets by passing through a squeezer and rolls.

I do not claim herein the process of welding scrap metal here disclosed, as this process is made the subject matter of my co-pending application Serial No. 601,131 filed January 6, 1911.

I claim:

1. In apparatus of the character described, the combination with a rotary balling chamber provided with a balling hearth, the surface of which is curved both longitudinally and transversely, of a barrel adapted also to be rotated, into which the charge is received and which feeds the same into the welding chamber.

2. In apparatus of the character described, the combination with a flame-way, of a rotary balling chamber, a barrel adapted also to be rotated, into which the charge is received and which feeds the same into the welding chamber, and a down draft flue which leads from the end of the barrel opposite the welding chamber.

3. In apparatus of the character described, a rotary element comprising a barrel formed with an enlarged section constituting a balling chamber said chamber being provided with a balling hearth, the surface of which is curved both longitudinally and transversely, the surface of said barrel on which the metal is sustained being slanted down toward the balling chamber.

4. In apparatus of the character described, a rotary element comprising a tapered barrel formed with an enlarged section constituting a balling chamber.

5. In apparatus of the character described, a rotary element comprising a barrel formed with an enlarged section constituting a balling chamber, said chamber being provided with a balling hearth, the surface of which is curved both longitudinally and transversely; the axis of said rotary element being oblique to the horizontal.

6. In apparatus of the character described, the combination with a flame-way, of a rotary element comprising a barrel formed on one end with an enlarged section constituting a balling chamber, said chamber being provided with a balling hearth, the surface of which is curved both longitudinally and transversely, the surface of said barrel on which the metal is sustained being slanted down toward the balling chamber, and a flue which leads from the other end of the barrel.

7. In apparatus of the character described, the combination with a flame-way, of a rotary element comprising a barrel formed on one end with an enlarged section constituting a balling chamber, the surface of said barrel on which the metal is sustained being slanted downward toward the balling chamber, a flue which leads from the other end of said barrel, and means for shifting said rotary element so as to expose the end normally alining with said flue.

8. In apparatus of the character described, the combination with a rotary element, of a turn-table on which said rotary element is mounted, means for rotating said element on its longitudinal axis comprising a circumferential gear on said element, a gear meshing therewith which is pivoted in alinement with the pivotal axis of the turn-table, and means for shifting the turn-table on its pivotal point.

9. In apparatus of the character described, the combination with a rotary element, of a turn-table on which said rotary element is mounted having a pivotal shaft, means for rotating said element on its axis comprising a circumferential gear on said element, a gear meshing therewith which is carried on said pivotal shaft, and means for shifting the turn-table on said pivotal shaft.

10. In apparatus of the character described, the combination with a rotary element, of a turn-table on which said rotary element is mounted having a pivotal shaft and a ball and socket bearing, means for rotating said element on its axis comprising a circumferential gear on said element, a gear meshing therewith which is carried on said pivotal shaft, and means for shifting the turn-table on said pivotal shaft.

11. In apparatus of the character described, the combination with a rotatable element, of a turn-table on which said rotatable element is supported with its axis of rotation oblique to the horizontal, a circumferential gear on said element, a gear wheel meshing therewith which is pivoted in alinement with the pivotal axis of the turn-table, means for shifting said turn-table on its pivotal axis, and means which takes the longitudinal thrust of said rotatable element, for the purpose described.

12. In apparatus of the character described, the combination with a rotatable element, of a turn-table on which said rotatable element is supported with its axis of rotation oblique to the horizontal, a circumferential gear on said element, a gear wheel meshing therewith which is pivoted in alinement with the pivotal axis of the turn-table, means for shifting said turn-table on its pivotal axis, and idlers which bear against a flat surface of said circumferential gear wheel, for the purpose described.

13. In apparatus of the character described, the combination with a flame-way, of a rotary and pivotally mounted element comprising a welding chamber, and a flue with which said rotary element is adapted to communicate, said flame-way and the end of said rotary element adjacent the flue being tapered, substantially as and for the purpose described.

14. In apparatus of the character described, the combination with a fire box having a flame-way, of a rotary element comprising a welding chamber which is greater in diameter than the flame-way, a bridge wall in said fire box, and means for introducing air under pressure through the bridge wall into the lower part of the flame-way.

15. In apparatus of the character described. the combination with a fire box having a flame-way, of a rotary element comprising a welding chamber which is greater in diameter than the flame-way, a bridge wall in said fire box, and means for introducing air under pressure through the bridge wall into the lower part of the flame-way, the upper wall of the fire box adjacent the bridge wall being slanted downwardly toward the welding chamber, substantially as and for the purpose described.

16. In apparatus of the character described, the combination with a flame-way, of a rotary element comprising a welding chamber which is mounted so that it may be shifted out of line with the flame-way, and a shield associated with said rotary element and so arranged as to be brought in front of the flame-way when the rotary element is shifted away from the same.

17. In apparatus of the character described, the combination with a fire box having a flame-way, of a rotary element comprising a welding chamber which is mounted so that it may be shifted out of line with said flame-way, a stack leading from the fire box and provided with a damper, and means actuated by the shifting of the rotary element for opening and closing said damper.

18. In apparatus of the character described, the combination with a fire box having a flame-way, of a rotary element comprising a welding chamber which is mounted so that it may be shifted out of line with said flame-way, a stack leading from the fire box and provided with a damper, means actuated by the shifting of the rotary element for opening and closing said damper, and a shield which is arranged so as to be brought in front of the flame-way when the rotary element is shifted away from the same.

19. In apparatus of the character described, the combination with a combustion chamber having a flame-way, of a flue, a rotary element comprising a welding chamber adapted to aline with said flame-way and flue and to be shifted out of alinement therewith, mechanism for so shifting said rotary element comprising a clutch, hand operated means for moving said clutch into its active position, and means for automatically throwing said clutch out of operation when the rotary element reaches the limit of its shifting movement in one direction or the other.

20. In apparatus of the character described, a rotary element comprising a barrel formed with an enlargement at one end constituting a balling chamber, said balling chamber being provided with a hearth over which the ball is adapted to be rolled, formed with respect to its longitudinal curvature, on a curve which is greater than that of the ball and which is non-symmetrical with regard to the axis of rotation of said rotary element so that the ball in turning over with the revolution of said rotary element has a tendency to be moved longitudinally of said hearth.

21. In apparatus of the character described, a rotary element which turns on an axis oblique to the horizontal and comprises a barrel formed with an enlargement at one end constituting a balling chamber, said balling chamber being provided with a hearth over which the ball is adapted to be rolled, formed, with respect to its longitudinal curvature, on a curve which is greater than that of the ball so that the ball in turning over with the revolution of said rotary element has a tendency to be moved longitudinally of said hearth.

22. In apparatus of the character described, a rotary element comprising a balling chamber which is provided with a hearth over which the ball is adapted to be rolled, formed, with respect to its longitudinal curvature, on a curve which is greater than that of the ball and which is non-symmetrical with regard to the axis of rotation of said balling chamber so that the ball in turning over with the revolution of said chamber has a tendency to be moved longitudinally of said hearth.

23. In apparatus of the character described, a rotary element which turns on an axis oblique to the horizontal and which comprises a balling chamber provided with a hearth over which the ball is adapted to be rolled, formed, with respect to its longitudinal curvature, on a curve which is greater than that of the ball so that the ball in turning over with the revolution of said chamber has a tendency to be moved longitudinally of said hearth.

24. In apparatus of the character described, a rotary element adapted to rotate on an axis oblique to the horizontal and comprising a barrel formed at one end with an enlargement constituting a balling chamber which is provided with a hearth curved both transversely and longitudinally, the longitudinal curvature of the hearth of the balling chamber being greater at the side of the chamber remote from the barrel than at the side adjacent thereto.

DAVID H. LENTZ.

Witnesses:
P. H. TRUMAN,
L. A. FALKENBERG.

---

It is hereby certified that in Letters Patent No. 1,012,872, granted December 26, 1911, upon the application of David H. Lentz, of Chicago, Illinois, for an improvement in "Apparatus for Balling Scrap Metal," an error appears in the printed specification requiring correction as follows: Page 1, line 92, for the word "intense" read *intensest;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.* scribed, a rotary element which turns on an axis oblique to the horizontal and which comprises a balling chamber provided with a hearth over which the ball is adapted to be rolled, formed, with respect to its longitudinal curvature, on a curve which is greater than that of the ball so that the ball in turning over with the revolution of said chamber has a tendency to be moved longitudinally of said hearth.

24. In apparatus of the character described, a rotary element adapted to rotate on an axis oblique to the horizontal and comprising a barrel formed at one end with an enlargement constituting a balling chamber which is provided with a hearth curved both transversely and longitudinally, the longitudinal curvature of the hearth of the balling chamber being greater at the side of the chamber remote from the barrel than at the side adjacent thereto.

DAVID H. LENTZ.

Witnesses:
P. H. TRUMAN,
L. A. FALKENBERG.

It is hereby certified that in Letters Patent No. 1,012,872, granted December 26, 1911, upon the application of David H. Lentz, of Chicago, Illinois, for an improvement in "Apparatus for Balling Scrap Metal," an error appears in the printed specification requiring correction as follows: Page 1, line 92, for the word "intense" read *intensest;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.*

Correction in Letters Patent No. 1,012,872.

It is hereby certified that in Letters Patent No. 1,012,872, granted December 26, 1911, upon the application of David H. Lentz, of Chicago, Illinois, for an improvement in "Apparatus for Balling Scrap Metal," an error appears in the printed specification requiring correction as follows: Page 1, line 92, for the word "intense" read *intensest;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.*